UNITED STATES PATENT OFFICE.

G. F. DE DOUHET, OF PARIS, FRANCE.

IMPROVEMENT IN THE MANUFACTURE OF PAINTS.

Specification forming part of Letters Patent No. 8,356, dated September 9, 1851.

*To all whom it may concern:*

Be it known that I, GUILLAUME FERDINAND DE DOUHET, of the city of Paris, in France, have invented a new and useful Improvement in the Manufacture of Chemical Coloring Compounds; and I do hereby declare that the following is a full, clear, and exact description of the same and of the manner in which it is to be applied in the arts.

The deoxidation or loss of oxygen which is undergone by certain bodies imparts to them new properties useful to the arts and industry. It is this deoxidation and the applications resulting therefrom that form the object of this invention.

The bodies which it is here intended to deoxidize are all sulphates soluble in water, metallic or alkaline, and certain insoluble sulphates—such as those of barytes, of strontian, and of lime. The deoxidation of the first is made by the humid method, and that of the second by the dry method. I deoxidize sulphates by the humid method by placing these sulphates dissolved in water in contact with sulphurets, likewise dissolved in water, and which in this state have a strong tendency to become again sulphates by receiving oxygen from the bodies which are being deoxidized.

In order that the operation may give products free from impurity, one of the two substances which combine must generally form an insoluble precipitate from the moment the mixture is made, so that the other remains transformed and dissolved in the liquid; but sometimes it is more useful for obtaining certain products to cause the formation of a double precipitate on the part of the two substances, as I will hereinafter explain.

In the system of deoxidation the deoxidizing body is a soluble sulphuret, the body to be deoxidized or deoxidated is any sulphate likewise soluble, and the precipitates are obtained pure or mixed, according as one or both of the two bodies producing this double decomposition have the property of being precipitated from the liquids which kept them dissolved before they were placed in contact. The watery or aqueous solutions of the sulphurets of barium, strontium, and calcium, otherwise called the "hydrosulphurets of baryta, of strontia, and of lime," are powerful agents for deoxidizing all soluble sulphates. I place in the first rank for this object sulphuret of barium when two solutions, one of sulphuret of barium and the other of any sulphate—sulphate of soda, for instance—are mixed. The sulphuret of barium, receiving oxygen from the sulphate of soda, becomes again sulphate of baryta, and is precipitated, while the deoxidized sulphate of soda is transformed into hydrosulphuret and remains dissolved in the liquid. The deoxidation of the sulphate is complete if the two materials for the double decomposition be mixed proportionally to their respective equivalents, while it is partial if the sulphureted solution is employed in less quantity than the equivalent of the sulphate. The same principles are applicable to the sulphate of potash and of ammonia; but they are modified as to the metallic sulphates of zinc, of copper, and of iron. Thus the sulphurets proceeding from the deoxidation of these different sulphates are themselves insoluble in water, and hence it is easy to conceive that they tend to precipitate at the moment of their formation; but as it is the same with the deoxidizing body—the sulphuret of barium—it happens then that the two ingredients of the mixture are precipitated simultaneously, leaving the waters exhausted or free from either salt. However, it would not be thus if, instead of sulphurets of barium, of strontium, or of calcium, the sulphurets of sodium, potassium, or ammonia be employed as deoxidizing agents, for in regaining oxygen from the metallic sulphates these sulphurets are again converted into sulphates; but they would nevertheless remain dissolved in the liquid, while the metallic bases, united with the sulphur, would precipitate alone and free from all impurity.

The deoxidation of the bodies above specified by the humid method thus gives rise to two orders of products. The first, liquids; they are the alkaline sulphurets, which remain in the solution. The second, solids; they are the precipitates of sulphate of barytes, strontian, or lime, and the hydrated metallic sulphurets, which are formed alone or mixed, according as the sulphate proceeding from the deoxidizing bodies is soluble or insoluble. Now, all are applicable to different useful purposes in industry, whether they be used separately, simultaneously, or mixed together, as I will now explain. As to the deoxidation by the dry process, it applies to insoluble sulphates of barytes, of strontian, and of lime, which, brought back to the state of sulphurets, are valuable agents, especially the sulphuret of barium, for the transformations I have just spoken of.

The deoxidation of these various bodies by their calcination with carbonaceous substances in crucibles and furnaces has been long known. I will say nothing further on the process; but I must, however, make the remark that if it were intended to manufacture the sulphurets of barium, strontium, or calcium rapidly and in large quantities it would be better to use the following method: calcine in any furnace, but better in a reverberatory furnace, blocks or cakes composed in volume, for instance, of half sulphate of baryta, in powder, and the other half of coal or charcoal, likewise in powder, and a sufficient quantity of fine clay mixed with water; or, still better, tar or asphalt to bind and spread over the whole. These blocks or bricks, dried till they have acquired sufficient firmness, are placed in the furnace, and care is taken during their calcination, which ought to be intense and carried on at a red heat during several hours, to direct upon them the greatest quantity of carbureted-hydrogen gas that can be obtained from the combustion of the coal in the furnace. For this purpose the part containing the fire which throws the heat upon the sole on which the bricks are placed must have a sufficient depth to allow a thick layer of coals to be constantly kept ignited in it, so that a part of the hydrogen of the fuel may in this manner be projected upon the incandescent bricks of sulphate of baryta. The calcination being ended, these bricks or cakes, having become pulverizable, are washed in hot water. A portion of the sulphate of baryta, deoxidized by the coal and hydrogen and converted into sulphuret of barium, dissolves in the water used for washing, forming hydrosulphuret of baryta. This portion varies from a fourth to three-fourths of the weight of the raw sulphate used, according as the operation has been more or less effectively conducted, and whether a reverberatory furnace, which is the best, has been employed, or an ordinary pottery or lime kiln, which, though very practicable, is less suitable. The surplus remains insoluble, in the water in the form of an earthy and carbonaceous residue, and is an excellent manure.

There is still another method less generally used, but which in certain cases may be employed with advantage, and which is carried out in the following manner: Place the sulphate of baryta, broken into bits, in cylinders of cast-iron, open at both ends, communicating by one of the two ends with an apparatus evolving hydrogen, and at the other end by means of a curved tube with a tub full of water. These cylinders are placed in a furnace in such a manner as to be easily brought to a red heat, and during the operation it is necessary that the stream of hydrogen from the apparatus in communication should constantly circulate on the sulphate, kept incandescent at the same degree of heat. If these precautions be carefully observed, sulphuret of barium is obtained after several hours of calcination; and if the operation be sufficiently prolonged, caustic baryta fit for the humid purposes for which it is used is obtained, for in this case the hydrogen, after having deoxidized the sulphate, desulphurizes it. This last mode of deoxidation and of preparation of baryta is, moreover, applicable to many other sulphates and oxides; but in certain cases, when the sulphate of baryta is siliceous, or when it is wished to accelerate its deoxidation, it is well to add to and to mix with the sulphate of baryta in the cylinders a quantity of coal or of powdered charcoal in proportions varying according to circumstances.

The following is the specification of the products which the deoxidation of certain bodies by the humid way and by the dry way give rise to when they are made to react upon each other, some being in the state of sulphates, the others in that of hydrosulphates, and the application they are susceptible of in industry.

First. The sulphates of soda and of potash, deoxidized by contact with the hydrosulphuret of baryta, as has been explained, are fit for the washing and whitening of wools or woven cloths, as well as the spun tissues of cotton and even of linen. These hydrosulphurets are employed according to the means used in washing, whether hot or cold, and sufficiently diluted to diminish their caustic power. They are, moreover, fit for the purposes to which the hydrates of soda and of potash are appliied by soap-makers, and form, when made into soap, using oil and other ordinary materials, a good ordinary soap having soda or potash for its base. They may, moreover, serve for the fabrication of artificial soda or potash, for it is only requisite to extract the sulphur by exposing them very concentrated and half crystallized to the action of a stream of carbonic acid to obtain soda or potash in the state of carbonate; but this manufacture can only be advantageous if it is desirable to obtain a large quantity of artificial sulphate of barytes, which, as has been before stated, forms the residue of this deoxidation. These secondary or residuary products are among the economical results of my invention.

Secondly. The hydrated metallic sulphurets or hydrosulphurets of zinc, copper, and iron, otherwise termed "oxides" of these different metals, mixed with sulphur, which, as aforesaid, are precipitate when their different sulphates are attacked by an alkaline hydrosulphuret whose sulphate is soluble in water— such as soda and potash—form white, black, greenish, and ocher colored precipitates, which, dried and calcined, become good colors to use in oil and varnish painting. These same metallic precipitates, prepared, on the contrary, by the deoxidation of their sulphates by means of an alkaline hydrosulphuret whose sulphate is insoluble—such as barytes, strontian, and even lime—form, according to the principles above specified, double precipitates of hydrated sulphurets of zinc, copper, and iron, and sulphate of barytes, of strontian, or of lime, mixed together. These double precipitates, which form colors fit for oil or varnish painting or for water-colors, are susceptible of important applications, and thus deserve a special mention with respect to their fabrication and their use.

I mix together two aqueous solutions, the one of sulphate, either of zinc, copper, or iron, the other of hydrosulphuret of baryta, both about equal in density. The solutions immediately yield up their respective bases, which precipitate together in the form of an abundant paste composed of sulphate of baryta and of the metallic bases, united with sulphur in proportion to the equivalent of the two materials for this double decomposition. The shade of color of this double precipitate depends upon the various metals that have been used. The essential point is that the double precipitation may take place to the thorough exhaustion of the baryta and of the metal, zinc, copper, or iron contained in the liquid, and we arrive at this result either by trial or by mixing the two ingredients of the combination proportionally to their equivalents. This double precipitate, well washed, decanted, and dried, is afterward calcined at a red heat on the sole of a muffle-furnace or reverberatory furnace, and then thrown at an intense heat into cold water, by which it gains that opacity which is in painting a valuable quality.

For painting in water-colors the process is more simple. I make use immediately of the double precipitate the moment after its formation and its subsequent washing, to apply it with water on the surface, to which it adheres without any other preparation; and when this painting is dry it is sufficient to pass over it a single coat of varnish to preserve it from dampness and to render it durable. These various precipitates, treated as has been before said, constitute, that with the zinc base a white color fit to replace ceruse, (white lead,) that with the copper or iron base other fast colors of various shades.

In lieu of hydrosulphurets of baryta, strontian, or lime, prepared, as shown, by the dry method, and specially in place of the first, I sometimes use as deoxidizing agents metallic sulphates, a solution of polysulphuret of lime prepared by the wet process by means of boiling together in water, sulphur, and lime. The double precipitate which results from its mixture with soluble metallic sulphates is not complete, for the lime has not the same strength for precipitation as baryta and strontian; but we may finish the operation by adding one of these hydrosulphurets to the liquid to be precipitated, and which had resisted the action of the lime. The color obtained by this process, though inferior to that described above, may be substituted in certain cases.

The artificial sulphates of baryta or of strontian, which precipitate themselves separately during the deoxidation above specified of the sulphates of soda or of potash, are susceptible of a new application.

It is known that the objection generally made to white oxide of zinc is that it wants body and bubbles under the brush. To do away with these objections the artificial sulphate of baryta is excellent when employed in the following manner: Incorporate in the artificial sulphate of baryta, when it is still in the state of a paste, from fifty to seventy per cent. of its weight of white zinc. The two substances are thoroughly mixed, then dried in small cakes which are calcined, and when red-hot thrown into cold water, as has been shown above.

What I claim as my invention, and desire to secure by Letters Patent, is—

The manufacture by the processes, substantially as herein described, of new colors fit for painting, whether with oil, varnish, spirits of turpentine, or water, by means of the deoxidation of the soluble metallic sulphates of zinc, copper, iron, and other metals, and by the precipitation of their bases either by alkaline hydrosulphurets whose sulphates are soluble—such as those of soda, potash, and ammonia—to obtain colors with a single metallic base, or to obtain colors with a double base, partly metal and partly alkaline sulphate, by using the alkaline hydrosulphurets whose sulphates are insoluble—such as those of baryta, of strontian, and of lime, and even by the hydrated sulphurets and polysulphurets of lime, prepared directly—substantially as herein set forth.

G. F. DE DOUHET.

Witnesses:
JOHN BARTLY,
C. GARDISSAL.